United States Patent [19]

Brown

[11] Patent Number: 4,826,173

[45] Date of Patent: May 2, 1989

[54] GOLF PRACTICE DEVICE

[76] Inventor: Edgar W. Brown, 1772 Chancellor Drive, Winnipeg, Manitoba, Canada, R3T 4B6

[21] Appl. No.: 111,204

[22] Filed: Oct. 21, 1987

[51] Int. Cl.$^4$ ............................................. A63B 69/36
[52] U.S. Cl. ...................... 273/186 E; 273/DIG. 30; 273/199 R; 273/346; 273/58 K
[58] Field of Search ....... 273/186 E, 162 E, DIG. 30, 273/346, 58 B, 424, 425, 186 A, 186 R, 183 C, 186 B, 58 K; 428/100

[56] References Cited

U.S. PATENT DOCUMENTS

| | | | |
|---|---|---|---|
| 3,071,379 | 7/1959 | Ramsey | 273/186 E |
| 3,325,168 | 6/1967 | Fyanes | 273/186 E |
| 3,721,447 | 3/1973 | Louderbach | 273/186 E |
| 4,029,316 | 6/1977 | Clarke | 273/DIG. 30 |
| 4,149,726 | 4/1979 | Tredway | 273/186 E |
| 4,244,576 | 1/1981 | Moisier et al. | 273/162 E |
| 4,596,392 | 6/1986 | Walker | 273/183 C |
| 4,637,616 | 1/1987 | Whiting | 273/186 D |

FOREIGN PATENT DOCUMENTS 2575075  6/1986  France ........................... 273/186 E
1489655 10/1977  United Kingdom ....... 273/DIG. 30

Primary Examiner—George J. Marlo
Attorney, Agent, or Firm—Ciotti & Murashige, Irell & Manella

[57] ABSTRACT

A narrow first strip of one component of "hook and loop" material is detachably secured across the face of any conventional golf club covering the striking zone. A "ball" is formed from the other component by forming a second strip into a hollow circular ring and joining the ends by any conventional manner such as adhesive. The width of the ring is substantially narrower than the diameter of the ring and the diameter of the ring is substantially equal to the diameter of a golf ball. When the club strikes the "ball" the two components coact to detachably secure one to the other so that the player can see the exact position of the engagement of the club head with the "ball". The sound of the golf club head striking the "ball" makes a sound similar to striking a conventional ball with the club, and the strip on the club head is easily removed and is reusable on the same or other clubs.

13 Claims, 1 Drawing Sheet

U.S. Patent     May 2, 1989     4,826,173
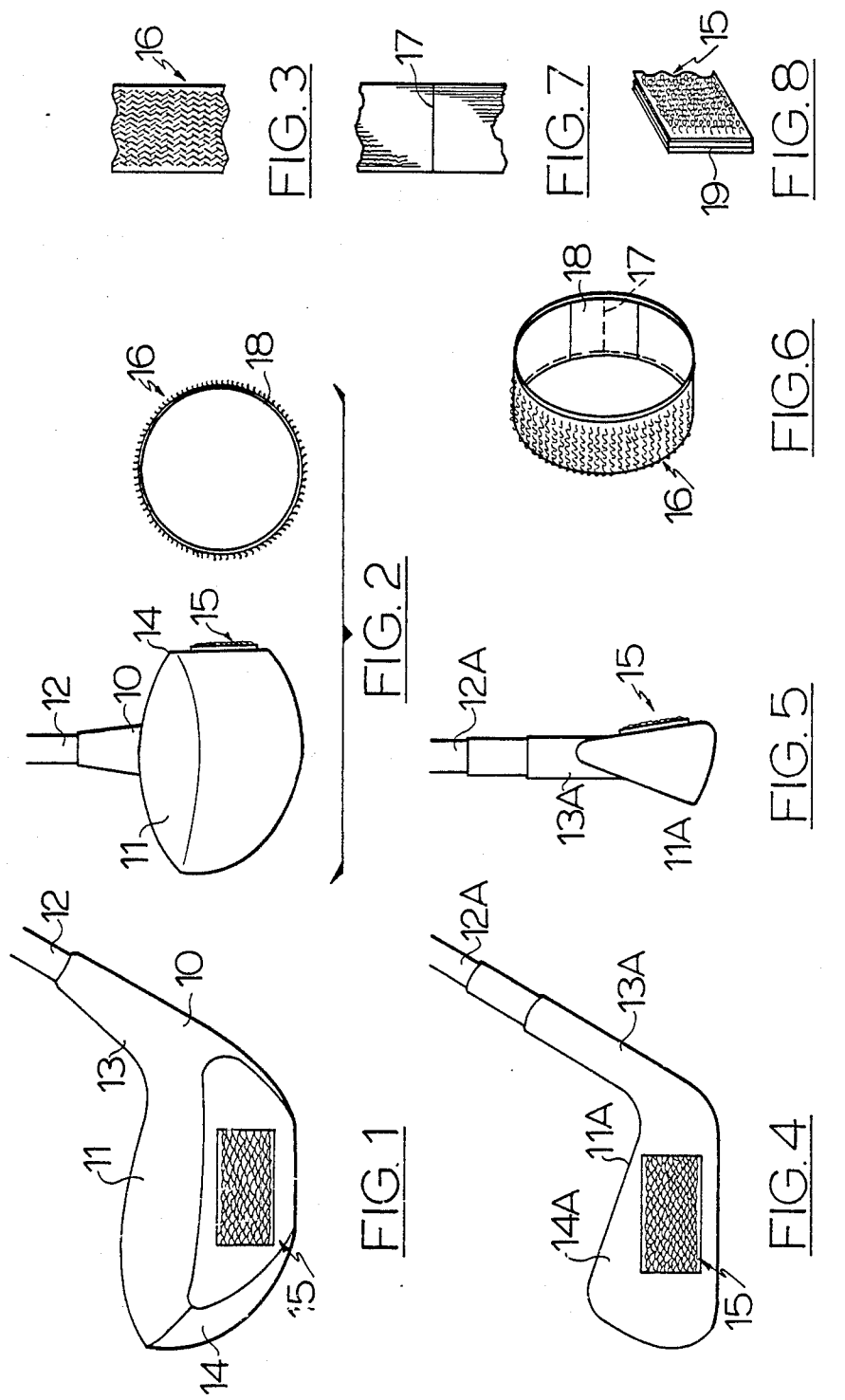

GOLF PRACTICE DEVICE

BACKGROUND OF THE INVENTION

The invention relates to new and useful improvements in practice devices for the game of golf.

While it is well known to practice golf on driving ranges having considerable area, and in which standard clubs and golf balls are utilized, nevertheless it is often desirable to practice the strokes of golf in a much more restricted location either in a residence or in the yard thereof.

Under these circumstances, it is not feasible to utilize standard golf balls because of the distance such balls travel when struck by a golf club, the only exception being the use of a putter for putting practice.

Lightweight synthetic plastic golf balls are known which comprise spheres which are multi-apertured but which still travel a considerable distance when struck with conventional golf clubs other than putters and can damage surroundings and/or people which might be struck thereby.

Other art known to applicant includes U.S. Pat. No. 4,596,392 issued to Grant W. Walker on June 24, 1986. This shows a practice ball for use in simulated golf driving which has a clay like energy absorbing deformable cores surrounded by an openwork or knit fabric carrying a powder readily dislodged upon impact of said pallet with a hard surface. This requires a target against which the pellet is driven, said pellet being relatively heavy.

U.S. Pat. No. 3,071,379 issued to E. W. Ramsey Jan. 1, 1963. This shows a cover for a driver or wood formed with two plies of elastomeric material and used with a conventional golf ball. When the ball is struck, the plies adhere together thus indicating where the ball was struck.

U.S. Pat. No. 3,325,168 issued to R. V. Fyanes, June 13, 1967. This again shows an attachment for a golf club such as a wood which includes an elongated barbed spike extending substantially perpendicular to the striking face of the club. This impinges upon a practice ball and impales the ball thereon so that the golfer can ascertain exactly where the ball is being struck. With the last two patents the cover or mounting harness is configured for attachment to one type of club, such as wood.

The closest reference known is U.S. Pat. No. 4,149,726 issued to W. B. Tredway Sr., on Apr. 17, 1979. This uses a resilient elongated "ball" filled with sponge rubber having a cover formed of a hook or loop material which co-acts with the opposite material secured to the face of the training golf club. This training golf club is a special club having the hook or loop material tautly stretched across a cavity formed in the base portion.

With some of the known practice systems, it would be very difficult to make them universally applicable to all clubs, including woods and irons. Where this is possible, several practice clubs are required to allow practice with each of the conventional woods and irons.

Where special practice clubs are used, it is difficult to match the player's real clubs as to weight, balance, shaft length and flexibility, etc., which generally detracts from the value normally received by the player if using his own clubs.

The present invention overcomes disadvantages inherent with known prior art and one aspect of the invention includes a golf club practice device formed from a material comprising a hook component co-acting with a loop component and comprising one component of said hook and loop material formed into an elongated strip having a length greater than the width thereof and means to detachably secure said strip across the ball engaging face of a conventional golf club and a strip engaging "ball" formed from the other of said components of said hook and loop material. The term "ball", including the quotion marks, is used in this application to designate a target object that is not a sphere, but is used in place of the normal spherical golf ball for practice purposes.

Another aspect of the invention is to provide, in combination with a golf club having a shaft and a head secured on one end of said shaft, said head including a substantially planar ball striking face on one side thereof, and a golf practice device formed from a material comprising a hook component co-acting with a loop component, one component of said hook and loop material being formed into a strip having a length substantially greater than the width thereof and means to detachably secure said one component across said ball engaging face of said golf club and a strip engaging "ball" formed from the other of said components of said hook and loop material.

A further aspect of the invention is to provide a device which can readily be incorporated in a temporary manner upon the face of any golf club whether it be a wood or iron and in which the "ball" can detachably adhere to the striking face of the head when struck. Furthermore, the strip on the face of the head of the golf club is easily removed and transferred to any other club. Furthermore, the invention does not add any appreciable weight to the club nor does it upset the balance thereof, this enables the player to utilize his or her own clubs without any noticeable effect on the weight or balance.

The use of the present device permits the golfer to ascertain exactly where the "ball" has engaged the striking face of the club due to the adhesion of the "ball" with the portion of the device detachably secured to the face of the club.

Still another advantage of the invention is to utilize the two components of hook and loop material manufactured under the trademark "Velcro" (T.M.) or equivalent types of material.

Another advantage is to provide a device of the character herewithin described which is simple in construction, economical in manufacture and otherwise well suited to the purposes for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a front elevation of the head of a golf club wood with one part of the invention secured to the striking face of the head.

FIG. 2 is a side elevation of FIG. 1 shown approaching the simulated "ball".

FIG. 3 is a view of the "ball" taken at right angles to FIG. 2.

FIG. 4 is a view similar to FIG. 1 but showing one part of the invention secured to an iron.

FIG. 5 is a side elevation of FIG. 4.

FIG. 6 is an isometric view of the "ball" showing one method of joining the two ends of the strip forming same.

FIG. 7 is a fragmentary view of the inside junction of the "ball" showing another method of securement.

FIG. 8 is an enlarged fragmentary isometric view of one end of the strip shown in FIGS. 1 and 4.

In the drawings like characters of reference indicate corresponding parts in the different figures.

DETAILED DESCRIPTION

Proceeding therefore to describe the invention in detail, reference should be made to the drawings in which 10 illustrates in general, a golf club such as a wood having a head 11 joined to the handle 12 by means of the hosel 13.

The front of the head constitutes the ball striking face 14 thereof and one part of the invention collectively designated 15 is adhesively secured across the striking area 14 of this face as will hereinafter be described.

FIG. 4 shows a view similar to FIG. 1 with the exception that an iron is shown once again with one portion 15 of the invention secured to the striking face 14A of the head 11A joined to the handle 12A by means of the hosel 13A.

The material 15 forms one part of a hook and loop material manufactured under the trademark "Velcro" (T.M.) although other manufactures of such materials are well known.

In FIGS. 1 and 4, a strip of one component of this material is illustrated and is rectangular when viewed in front elevation with the length being greater than the height thereof and covering the striking area of the face 14 of the golf club head. In the present embodiment, the portion of the material securable to the golf club head is the loop component although of course the hook component may be used if desired.

The "ball" collectively designated 16 is formed from the other component of the material, in this instance being the hook component and is formed from an elongated strip of the hook material which is in the form of a hollow ring with the ends 17 of the strip butted together and the hook formation 18 being situated on the outer surface. FIGS. 6 and 7 show two methods of joining the butted ends 17. In FIG. 7 these ends may be secured together as by sewing, heat sealing or ultrasonic welding whereas in FIG. 6, these ends are overlapped on the inner side thereof by means of a tape or patch 18 which may be secured to the inner surface and spanning the butted ends 17 also by adhesive, sewing, heat sealing or ultrasonic welding. The inner surface may, if desired, be stiffened by a backing sheet (not illustrated) if it is desired to stiffen the overall configuration of the "ball". Not shown is a fastening comprising overlapping of the two ends and sealing same by any conventional method.

The strip portion or component 15 may be detachably secured to the striking face 14 of the golf club by an adhesive which permits the strip to be adhesively secured and peeled off many times. FIG. 8 shows a convenient method of detachably securing the strip to the face 14 and takes the form of a pressure sensitive double faced tape 19 adhesively secured by one face thereof to the rear surface of the component 15 and being detachably securable to the face 14 of the golf club head 11. Conventionally, this other face is protected by means of a thin plastic strip which may be peeled off when it is desired to adhere the strip to the head and may be replaced when the strip has been removed from the head, for storage purposes.

FIG. 2 shows the cooperation between the two portions of the material as the golf club approaches the "ball" 16. The hook and loop components co-act together to detachably secure the "ball" to the club head so that the exact positioning of the club head and "ball" may be ascertained. The nature of the material forming the "ball" gives a satisfying "click" as the head strikes the "ball" and simulates the sound of a club head striking a real golf ball.

The device is also useful in training the player to maintain his head in the correct position as the club strikes the "ball" as it is obviously not necessary to raise the head in order to see where the "ball" is going.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A golf practice device formed from a material comprising a hook component co-acting with a loop component and comprising one component of said hook and loop material formed into an elongated first strip having a length greater than the width thereof and means to detachably secure said first strip across the ball engaging face of a conventional golf club, and a target object comprising a hollow ring formed from a second strip of the other of said components of said hook and loop material, said hollow ring having a width substantially narrower than the diameter thereof, said diameter being approximately equal to the diameter of a conventional golf ball, and including fastening means to join the ends of said second strip together to form said ring.

2. The device according to claim 1 in which the ends of said second strip are butted together and said fastening means comprise means for sealing said butted ends together.

3. The device according to claim 1 in which the ends of said second strip are butted together and the fastening means comprise a patch secured on the inner surface of said second strip overlapping said butted ends.

4. The device according to claim 1 in which said means to detachably secure said first strip across the ball engaging face of a conventional golf club head consists of an adhesive securing said strip to said face.

5. The device according to claim 1 in which said means to detachably secure said first strip across the ball engaging face of a conventional golf club head includes double faced adhesive tape secured by one side thereof to the rear side of said first strip and detachably securable to said golf club head by the other side of said tape.

6. The device according to claim 1 in which said means to detachably secure said first strip across the ball engaging face of a conventional golf club head consists of an adhesive securing said strip to said face.

7. The device according to claim 1 in which said means to detachably said first strip across the ball engaging face of a conventional golf club head includes double faced adhesive tape secured by one side thereof to the rear side of said first strip and detachably securable to said golf club head by the other side of said tape.

8. In combination, a golf club having a shaft and a head secured on one end of said shaft, said head including a substantially planar ball striking face on one side thereof, and a golf practice device formed from a material comprising a hook component co-acting with a loop component, one component of said hook and loop material being formed into a first strip having a length substantially greater than the width thereof and means securing said first strip across said ball engaging face of said golf club and a target object comprising a hollow ring formed from a second strip of the other of said components of said hook and loop material, said hollow ring having a width substantially narrower than the diameter thereof, said diameter being approximately equal to the diameter of a conventional golf ball, and including fastening means to join the ends of said second strip together to form said ring.

9. The combination according to claim 8 in the ends of said second strip are butted together and said fastening means comprise means for sealing said butted ends together.

10. The combination according to claim 8 in which the ends of said second strip are butted together and the fastening means comprise a patch on the inner surface of said second strip overlapping said butted ends.

11. A practice target object for the game of golf formed from one component of a hook and loop fastener material, comprising a strip of the one component formed into a hollow ring, the width of said strip being substantially narrower than the diameter of said hollow ring, the diameter of said hollow ring being approximately equal to the diameter of a conventional golf ball.

12. The practice target object according to claim 11 in which the ends of said strip are butted together and including means sealing said butted ends together.

13. The simulated practice "ball" according to claim 11 in which the ends of said strip are butted together and including a patch secured on the inner surface of said strip overlapping said butted ends.

* * * * *